May 3, 1927.

C. H. HUGHES ET AL 1,627,512

ARTIFICIAL BAIT

Filed Aug. 3, 1925

INVENTORS.
Charles H. Hughes
Bernard E. Kothe
James N. Ramsey
ATTORNEY.

Patented May 3, 1927.

1,627,512

UNITED STATES PATENT OFFICE.

CHARLES H. HUGHES AND BERNARD E. KOTHE, OF CINCINNATI, OHIO.

ARTIFICIAL BAIT.

Application filed August 3, 1925. Serial No. 47,840.

The invention relates to artificial bait.

The object of the invention is to provide an artificial bait which, in appearance and automatic movement of the tail, resembles a live minnow, or the like. Other objects and advantages will appear as set forth.

The invention consists in providing the imitation fish body of wood or other suitable material having a shaft with a propeller wheel on one end adapted to operate a pivoted tail on the other end to give the artificial bait the illusive appearance of a live fish.

The invention also consists in providing artificial fins disposed at an upward inwardly converging angle to support the artificial bait in upright position and to permit it to assume a horizontal position as the bait is drawn through the water by the line.

The invention further consists in providing a transverse hole and inter engaging bail having each end provided with a hook, whereby the ends are inserted in said hole between the eyes of the fish bait and interlocked therein.

The invention also consists in the details of construction and in the combination, arragement and location of parts, as herein set forth and claimed.

Figure 1:
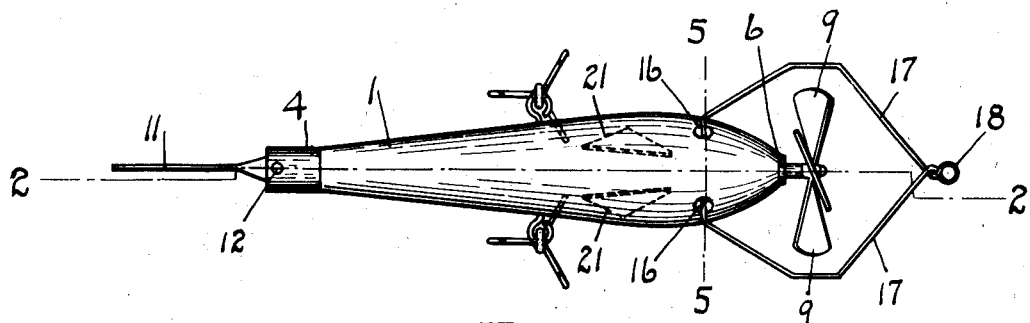
Fig. 1 is a plan view.
Figure 2:
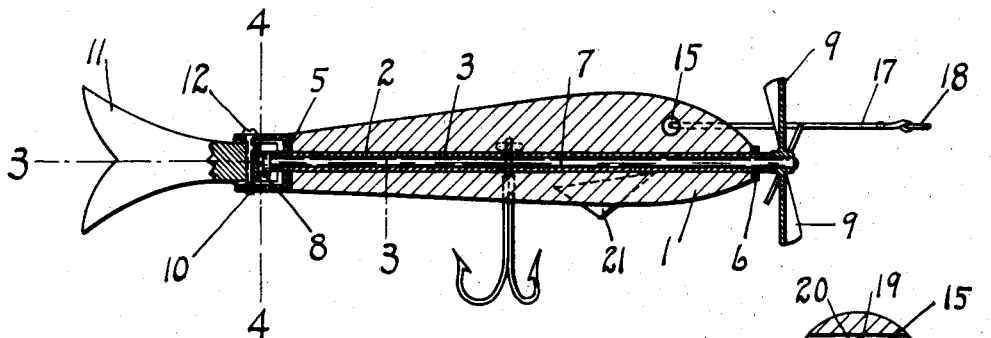
Fig. 2 is a section taken on the line 2—2 of Fig. 1.
Figure 5:
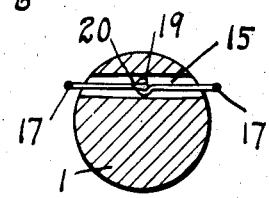
Fig. 5 is a section taken on the line 5—5 of Fig. 1.
Figure 3:
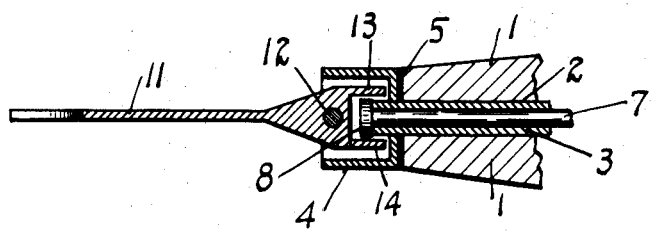
Fig. 3 is a section taken on the line 3—3 of Fig. 2.
Figure 4:
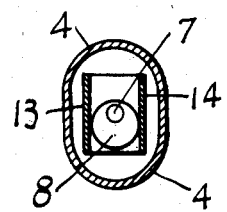
Fig. 4 is a section taken on the line 4—4 of Fig. 2.
Figure 6:
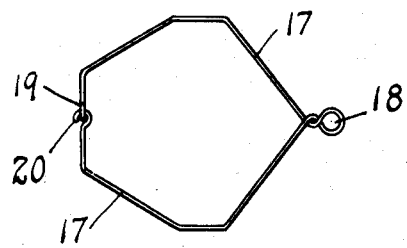
Fig. 6 is a plan view of the bail, showing the hooked ends interlocked in the position assumed when in the hole between the eyes of the artificial fish bait.

In the embodiment of the invention, as illustrated, and which shows a preferred construction, the bait body 1 is preferably formed of wood or other light material and is finished and colored in such a manner as to closely imitate a fish, such as a live minnow, which is found to be a fine bait for catching bass, pike, muskalonge, trout, and other fish. A hole 2 extends longitudinally through the imitation fish body. A tube 3 having cup 4 soldered or otherwise secured thereon adjacent the rear end is inserted in said hole and putty 5 is interposed between the end of the fish body and the cup to form a close and watertight joint. The front end of the tube extends beyond the end of the nose of the fish and has mounted thereon a washer 6 which is soldered to the tube whereby the wood body of the fish is held from endwise movement relative to said tube. A shaft 7 having eccentric 8 fixed on the end thereof, is inserted through said cup into said tube until said eccentric abuts the rear end of said tube in said cup and its forward end extends outwardly beyond said tube and has mounted thereon propeller wheel 9 which is suitably soldered to said shaft. Cup 4 is provided with a hole in its top and a threaded hole 10 in its bottom near the outer end and an artificial fish tail 11 of rubber or metal is pivotally mounted in said cup on pin 12 which is screwed into said threaded hole by means of a screw driver. Said fish tail is provided on its inner end with vertical flanges 13 and 14 against which the eccentric 8 bears as it revolves, thereby moving said tail from side to side upon screw pin or pivot 12 and thereby causing said artificial bait to have the appearance of a live fish on account of the wiggling movement of its tail, caused by the movement of the propeller wheel through the shaft and eccentric operating on the flanges of the pivotally mounted tail. A transverse hole 15 extends through the upper part of the fish head and through the eyes 16 of the line bail 17 which comprises spring wire having a line loop 18 on its outer part and hooks 19 and 20 on its ends which are inserted in said hole and said hooks are forced past and into engagement with each other, as shown in Fig. 5, whereby said ends are interlocked from disengagement. The fish line (not shown) is attached to loop 18. The body of the fish is provided with metal tapered fins 21 disposed at an upward angle near the front of the fish body, as shown in Figs. 1 and 2 for the purpose of supporting the body in an upright horizontal position and to prevent rolling action of the body in the water. Disposing the fins at an upward angle toward the front end of the bait results in their being wider spaced apart at the rear than at the front and causes the bait body to more readily assume a horizontal position as it glides over or through the water.

A plurality of triple fishing hooks are preferably mounted one on each side near the center of the bait and are each held in position by screw eye or other suitable means on which they are pivoted. However, one or more hooks, as desired, may be used, and their position may be varied as desired.

When the parts comprising the artificial bait are assembled, as shown in Figs. 1 and 2 and attached to a fish line the bait is ready for use, and by throwing the line a considerable distance into the water, say for instance, fifty feet, the usual reel holding the line is then slowly wound, drawing the bait forwardly through the water, whereby the propeller wheel 9 is caused to rotate. This in turn, revolves shaft 7 and eccentric 8 which latter engages the flanges 13 and 14 of the fish tail, causing it to oscillate or wiggle on suitable means such as on screw pin or pivot 12. This action results in giving to the artificial minnow or other artificial bait a movement of the tail in simulation and appearance of that of a natural or live fish, or other live bait, as the case may be, whereby the live fish are induced to strike at said bait and thereby become empaled upon the fish hooks and caught.

While we have shown a particular construction and arrangement, we desire it to be understood that our invention is capable of modification without departure from its scope or spirit as defined in the claim.

What we claim as new and desire to secure by Letters Patent is:

An artificial bait made in imitation of a fish and provided with empaling means and having a pivotally mounted tail, means to oscillate said tail, said bait having a transverse hole extending therethrough near its forward end and a bail having a loop at one part and hooks on its ends whereby when the hooked ends of said bait are inserted in said hole, said hooks will interengage and lock, substantially as set forth.

CHARLES H. HUGHES.
BERNARD E. KOTHE.